Figure 1:
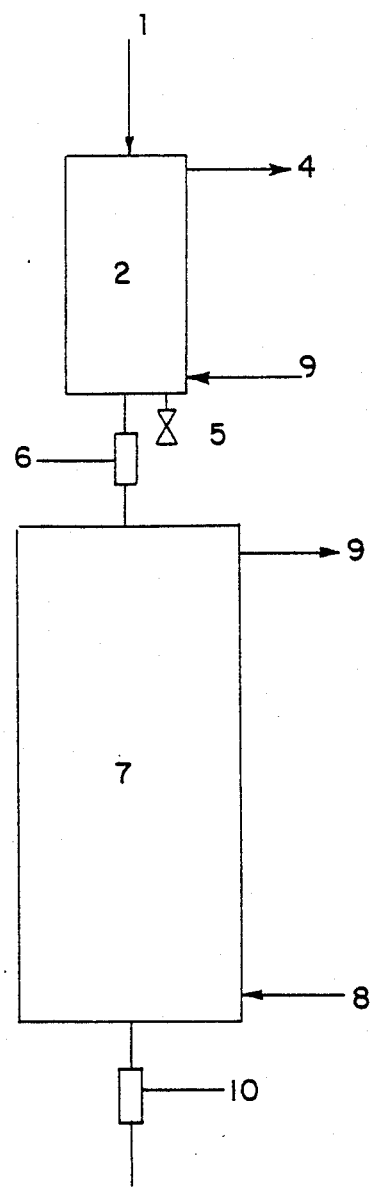

United States Patent [19]
El-Ghatta et al.

[11] Patent Number: 4,591,629
[45] Date of Patent: May 27, 1986

[54] PROCESS FOR THE PURIFICATION OF HIGH MOLECULAR WEIGHT POLYESTERS

[75] Inventors: Hussain El-Ghatta; Hans-Werner Philipp; Richard Sailer; Bruno Domeisen, all of Chur, Switzerland

[73] Assignee: EMS-Inventa AG, Zurich, Switzerland

[21] Appl. No.: 487,518

[22] Filed: Apr. 21, 1983

[51] Int. Cl.$^4$ .............................................. C08G 63/16
[52] U.S. Cl. .............................. 528/308.2; 528/308.1; 528/483; 528/490; 528/500; 528/501
[58] Field of Search ...................... 528/308.2, 483, 490, 528/500, 501, 272, 308.1; 264/236, 345, 347

[56] References Cited

U.S. PATENT DOCUMENTS

| | | | |
|---|---|---|---|
| 3,756,990 | 9/1973 | Jaeger et al. | 528/308.2 X |
| 4,230,819 | 10/1980 | Hauenstein et al. | 528/483 |
| 4,263,425 | 4/1981 | Rothe et al. | 528/308.1 |
| 4,289,871 | 9/1981 | Rowan et al. | 528/272 X |
| 4,390,398 | 6/1983 | Coker et al. | 528/272 X |

*Primary Examiner*—Lucille M. Phynes
*Attorney, Agent, or Firm*—Bierman, Bierman & Peroff

[57] ABSTRACT

A method for reducing the volatile component content of crude high molecular weight polyesters containing said component. The method comprises first contacting the crude polyester with steam, or a mixture of steam and inert gas and/or air, at a temperature of 100° to 245° C. to form a partially treated polyester. The second step comprises further contacting the product of the first step with an inert gas and/or air at a temperature of 200° to 245° C. to produce the purified polyester.

In particular, the method is intended for use with such polyesters as polyethylene terephthalate which contains acetaldehyde as the undesired volatile component.

A new method of analysis useful in the foregoing process is also disclosed. The products of the new process are primarily intended for use in the manufacture of plastic bottles or similar containers for use in the foodstuffs industry.

17 Claims, 1 Drawing Figure

PROCESS FOR THE PURIFICATION OF HIGH MOLECULAR WEIGHT POLYESTERS

The present invention is directed to a process for reducing or removing the volatile components of high molecular weight polyesters.

Such polyesters, e.g. polyethylene terephthalate, are becoming increasingly important for use in producing containers for foods. This is especially true of those which are secondarily condensed in the solid phase. Typically, such condensation is carried out in accordance with the method described in U.S. Pat. No. 3,733,309. When produced by the prior art processes, these polyesters retain an unacceptable level of highly volatile materials, particularly acetaldehydes. The latter are present both as chemically bound vinyl esters as well as being in physical solution. Polymers containing these components (which are often present in amounts of approximately 100 ppm) are unsuitable for use in the foodstuffs industry because of the undesirable bad odors which they emit.

Various means have been proposed to eliminate these components from the polyester. For example, U.S. Pat. No. 4,263,425 describes a process which comprises gasification of the polyethylene terephthalate at 200° to 220° C. in the presence of inert gases. However, the polyester must contain less than 25 ppm ester radical interchange catalysts or 20 ppm phosphoric acid. Also, U.S. Pat. No. 4,223,128 teaches the treatment of solid polyethylene terephthalate with air at 180° to 220° C. These processes result in products which still contain too much physically dissolved and chemically bound acetaldehydes to be used in the food industry.

The present invention is a continuous process for the purification of high molecular weight polyesters, especially polyethylene terephthalate, by means of which the total content of volatile components can be substantially reduced in comparison to prior art processes. In particular, the total content of acetaldehydes can be brought down to less than 3 ppm.

While the present invention will be described with particular reference to polyethylene terephthalate as the polyester and acetaldehydes as the volatile components, it will be understood that it is broadly applicable to polyesters and volatile components thereof, in general. It is particularly applicable to polycondensates from (cyclo) aliphatic diols and dicarboxylic acids, preferably aromatic dicarboxylic acids.

The process comprises contacting the crude polyester with steam, or a mixture of steam and inert gas and/or air, at a temperature of 100° to 245° C. to form the partially treated polyester. This step is followed by further contacting the partially treated polyester with an inert gas and/or air at a temperature of 200° to 245° C. to produce the purified polyester. The second step is preferably carried out at atmospheric pressure or under vacuum.

The polyester is prepared in known manner from diols and dicarboxylic acids. Preferred diols are alkylene glycols (particularly α,ω-alkylene glycols), such as ethylene glycol, 1,3-propylene glycol, 1,4-butylene glycol; as well as cycloalkane alkylols, e.g. cyclohexane-1,4-dimethylol; or cycloalkane diols, such as cyclohexane-1,4-diol. As dicarboxylic acids, the aromatic acids are preferred, although aliphatic acids are also suitable. Such acids as terephthalic, isophthalic, naphthalenedicarboxylic, as well as adipic, sebacic, and the like may be used advantageously. In addition to the foregoing, mixtures of the diols and/or dicarboxylic acids may be useful, especially for cross-linking. Also, small proportions of multi-functional alcohols and/or carboxylic acids having three or more functional groups may be included.

With more specific reference to polyethylene terephthalate, it is known that elimination of the physically dissolved acetaldehyde is a function of the diffusion processes of the acetaldehyde from the polyester. However, to remove the chemically bound acetaldehyde, the vinyl ester groups must first be converted into free acetaldehydes. The prior art processes have not been truly successful in doing this.

The present Inventors have discovered that, if steam is present in accordance with the process of the present invention, the chemically bound acetaldehyde will be converted into free acetaldehyde and hence can be removed. This reaction occurs almost quantitatively, and there are no disadvantageous effects on the polyester granulate.

In order to assist in the operation of the present process, a new method for determining the total content of the physically dissolved and chemically bound acetaldehyde has been developed. Specifically, the polyester sample is ground, preferably to 20 to 50 mesh, placed in a container with oxygen-free water. Preferably, there should be approximately ten times the amount of water as polyester sample. The container (which is advantageously a glass bottle) is sealed, preferably with a teflon-coated rubber septum. It is then heated to 100° to 140° C. for 15 to 20 hours, preferably to about 120° C. for appoximately 17 hours. After the bottle has cooled, a sample of the aqueous solution is removed and analyzed for acetaldehyde content by known means, such as the Head-Space gas chromatography or colorimetric methods.

Previously known analysis methods for determining the acetaldehyde content of polyesters have been described in, for example, DOS No. 28 34 162 and U.S. Pat. No. 4,223,128. In accordance with DOS No. 28 34 162, a sample of the ground polyester is sealed in a glass test tube with a rubber septum. The air is replaced by nitrogen and the test tube is heated to 150° C. for 90 minutes. A sample of the acetaldehyde-nitrogen mixture is analyzed by gas chromatography. These methods are similar to those described in U.S. Pat. No. 4,223,128. However, these methods do not determine the total acetaldehyde in the polyester.

For example, a commercial polyethylene terephthalate granulate (Hoechst M81E) was tested in accordance with the prior art analysis methods which produced an acetaldehyde content determination of 2.6 ppm. This compares favorably with the data which the manufacturer furnishes which indicates the presence of 2 to 3 ppm acetaldehyde. However, when the same granulate is tested in accordance with the analysis method of the present invention, a total acetaldehyde content of 9.4 ppm is found. Obviously, the new method is far more complete than the prior art processes.

Therefore, the present invention is directed primarily to producing high molecular weight polyethylene terephthalate having a total content of dissolved and bound acetaldehyde of less than 3 ppm, determined by the new method. It is to be preferred that the crude terephthalate be a solid having an initial intrinsic viscosity of at least 0.35. Preferably, it is present in granular form.

In the preferred form of the first stage, wherein the polyester is contacted with steam or a steam-containing gas, the reaction is continued until the total content of acetaldehyde is less than 20 ppm. More preferably, this amount should be less than 10 ppm and, most preferably, less than 5 ppm. This level can be determined by removing a sample from the discharge of the first stage and analyzing it in accordance with the foregoing newly-discovered method.

In the first stage, while steam alone is preferred, it is also possible to use a mixture of steam and air and/or inert gas. The second stage takes place in known manner under inert gas and/or air. Inert gas, especially nitrogen, is to be preferred.

The process of the present invention can be carried out in the usual reactors. The first and second stages can be designed as either a 1-piece (2 zone) reactor, or a reactor comprising two separate chambers, one for each of the two stages. In general, it has been found that the separate chambers are superior. The water vapor (optionally in combination with inert gas and/or air) is introduced at the appropriate temperature and the granular polyester is contacted thereby. The partially purified product is then conveyed to the second stage where it is contacted by the inert gas and/or air.

In the accompanying drawing, constituting a part hereof and in which like reference characters indicate like parts, the single FIGURE is a schematic representation of a suitable apparatus for the carrying out of the present process.

First stage 2 is provided with feed opening 1 through which the crude polyethylene terephthalate is charged. This material, as previously indicated, normally has a total acetaldehyde content on the order of 100 ppm. Steam at 240° C. is introduced through first stage inlet 3 and passes in countercurrent direction over the descending terephthalate and exits through first stage outlet 4. Sample valve 5 is provided to withdraw a sample of the partially purified terephthalate so that a determination of the acetaldehyde content thereof can be made. The acetaldehyde content should be less than 20 ppm, preferably less than 10 ppm and most preferably less than 5 ppm. The partially purified terephthalate is transferred through connecting pipe 6 into second stage 7. Nitrogen at 240° C. is introduced into second stage 7 through second stage inlet 8. It passes in countercurrent direction to the polyester and exits through second stage outlet 9. The finished product is removed through discharge 10.

When the process of the present invention is carried out, secondarily condensed polyethylene terephthalate is obtained having a total content of physically dissolved and chemically bound acetaldehyde of less than 3 ppm, when determined by the new analysis method. Moreover, the intrinsic viscosity is normally at least 0.7. The end product not only has the desired and required intrinsic viscosity, but also no substantial prolongation of the second stage is required. Moreover, the total acetaldehyde is removed many times more effectively than was possible by prior methods. The terephthalates made in accordance with the present invention, as a result of their high quality condensation and virtual complete absence of acetaldehyde and other volatile substances, are particularly valuable for use in the manufacture of bottles and plastic sheets for containing foods.

To illustrate the present invention, the following examples are set forth.

EXAMPLES 1 THROUGH 7

50 kg/hr polyethylene terephthalate granulate, having an intrinsic viscosity of 0.668 and a total acetaldehyde content of 76 ppm, is introduced into first stage 2. A countercurrent flow of steam is introduced through inlet 3 and exits through outlet 4. The resultant partially purified granulate passes through connecting pipe 6 and into second stage 7. In second stage 7, the granulate is subjected to a second countercurrent of nitrogen. The nitrogen enters at inlet 8 and exits at inlet 9. The finished product is removed through discharge 10.

The various reaction conditions, including a comparison with the prior art in Example 7, are set forth in the accompanying Table, as are the characteristics of the materials obtained from both the first and second stages.

While only a limited number of embodiments of the present invention have been expressly described, it is, nonetheless, to be broadly construed and not to be limited except by the character of the claims appended hereto.

TABLE

| | First Stage | | | Second Stage | | | |
|---|---|---|---|---|---|---|---|
| | Water Vapor Treatment | | Granulate Analysis after Water Vapor Treatment | | Secondary Condensation | Granulate Analysis at End of Secondary | |
| Example No. | Entry Temperature of Water Vapor °C. | Time under Treatment for Granulate Minutes | Total Acetaldehyde Content ppm | Entry Temperature °C. | Time under Treatment for Granulate Minutes | Total Acetaldehyde Content ppm | Intrinsic Viscosity[2] |
| 1 | 240 | 15 | 4.0 | 240 | 240 | 0.4 | 0.810 |
| 2 | 230 | 15 | 4.5 | 230 | 360 | 0.6 | 0.822 |
| 3 | 220 | 15 | 5.0 | 230 | 360 | 0.7 | 0.837 |
| 4 | 190 | 120 | 4.5 | 230 | 360 | 0.6 | 0.845 |
| 5 | 160 | 120 | 17.5 | 235 | 300 | 1.92 | 0.896 |
| 6[3] | 190 | 120 | 4.5 | 235 | 360 | 0.45 | 0.830 |
| 7[4] | | | | 240 | 360 | 4.4 | 0.860 |

[1]Water Vapor mass/granulate mass = 0.5 kg/kg
[2]0.5 g sample in 100 ml mixture of phenol and 1,1,2,2-tetrachloroethane (in mutual weight ratio of 1:1), measured at 20° C.
[3]In this test, the 10% by volume air was added to the steam.
[4]Comparison example, without water vapor treatment.

What we claim is:

1. A method for reducing the volatile component content of crude high molecular weight polyesters containing said component, which method comprises first contacting said crude polyester with steam, or a mixture of steam and inert gas and/or air, at a first temperature of 100° to 245° C., to form a partially treated polyester, and further contacting said partially treated polyester with inert gas and/or air at a second temperature of 200° to 245° C. to produce a purified polyester.

2. The method of claim 1 wherein said further contacting is carried out at or below about atmospheric pressure.

3. The method of claim 1 wherein said polyester is polyethylene terephthalate, said component comprises acetaldehyde, and said purified polyester has less than 3 ppm total physically dissolved and chemically bound acetaldehyde.

4. The method of claim 3 wherein said crude polyester has an intrinsic viscosity of at least 0.35.

5. The method of claim 3 wherein said partially treated polyester has total physically dissolved and chemically bound acetaldehyde content of less than 20 ppm.

6. The method of claim 5 wherein the physically dissolved and chemically bound acetaldehyde content of said partially treated polyester is less than 10 ppm.

7. The method of claim 6 wherein the physically dissolved and chemically bound acetaldehyde content of said partially treated polyester is below about 5 ppm.

8. The method of claim 1 wherein said polyester comprises diol portions and dicarboxylic acid elements.

9. The method of claim 8 wherein diols comprise alkylene glycols, cycloalkane alkylols, or cycloalkanediols.

10. The method of claim 9 wherein said glycols are $\alpha,\omega$-alkylene glycols.

11. The method of claim 9 wherein said glycols are ethylene glycol; 1,3 propylene glycol; 1,4 butylene glycol; said cycloalkane alkylol is cyclohexane-1,4-dimethylol, and said cycloalkanediol is cyclohexane-1,4-diol.

12. The method of claim 8 wherein said acids comprise terephthalate, isophthalate, naphthalene-dicarboxylic, adipic, or sebacic.

13. The method of claim 8 wherein there are also present multi functional alcohols and/or carboxylic acids having three or more functional groups.

14. The method of claim 3 wherein the intrinsic viscosity of said purified polyester is at least about 0.7.

15. The method of claim 3 wherein said first temperature is 160° to 240° C.

16. The method of claim 3 wherein said first contacting is for a period of about 15 to about 120 minutes.

17. The method of claim 8 wherein said dicarboxylic acid is aromatic.

* * * * *